Dec. 22, 1959 H. G. TWIFORD 2,918,115
BEAD SEATING AND INFLATING DEVICE FOR TUBELESS TIRES
Filed Dec. 7, 1955 2 Sheets-Sheet 1

INVENTOR.
Harry G. Twiford
BY
ATTORNEYS

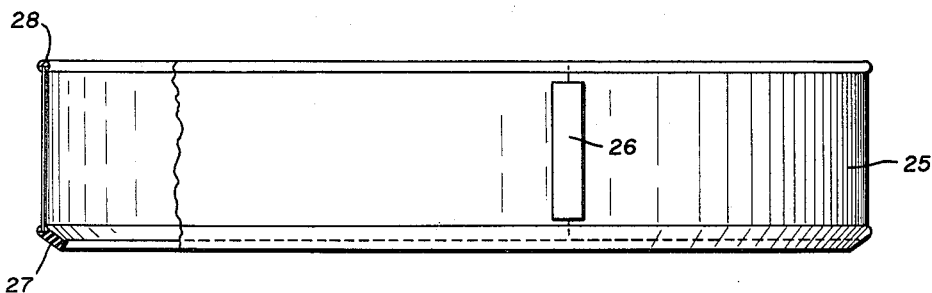
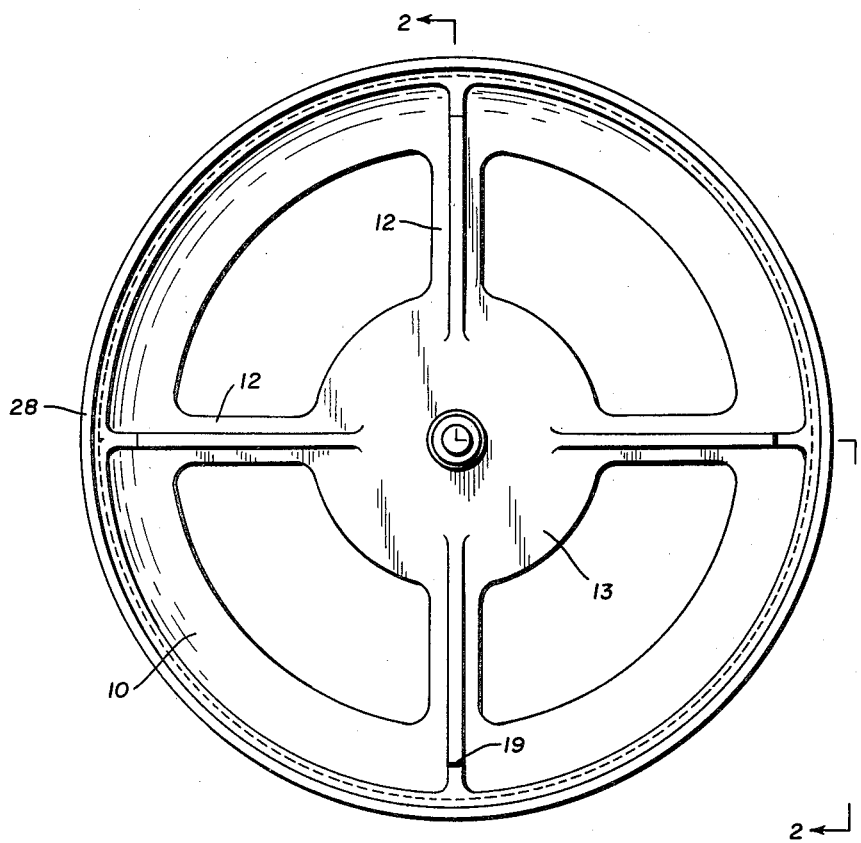
Fig. -4
Fig. -3
INVENTOR.
Harry G. Twiford

Patented Dec. 22, 1959

2,918,115

BEAD SEATING AND INFLATING DEVICE FOR TUBELESS TIRES

Harry G. Twiford, Denver, Colo.

Application December 7, 1955, Serial No. 551,545

4 Claims. (Cl. 157—1.1)

This invention relates to devices for aiding the inflation of tubeless tires mounted on a wheel, and more particularly to a device which retains the air in a tubeless tire while it is being inflated and before the bead of the tire is sealed against the rim flanges of the wheel.

The changing of modern tubeless tires on a vehicle wheel is a highly complicated and difficult task with the tools available since the vast majority of them are for use with the old style tires using inner tubes. In replacing a tubeless tire on a wheel considerable difficulty is encountered in inflating the tire since the beads of the tire are not sealed against the rim flanges of the wheel. One common method of forcing the beads against the rim flanges so that the tire may be filled with air is to place a band around the tread of the tire. By contracting the band to squeeze the tire, the beads of the tire are forced laterally against the rim flanges of the wheel. This system is unwieldy and is not always satisfactory due to the bead sticking in the wheel with resulting damage to the tire wall. Furthermore, due to the different sizes of tires in common use an expandable band must be available which further complicates the problem.

In the normal tire changing operation with a wheel held horizontally on a wheel-holding table and with a tire being mounted on the wheel, the lower bead of the tire is usually pressed against the lower rim flange by the weight of the tire forming a sufficient seal for holding air during inflation. The upper bead, however, is not in contact with the groove. According to the present invention, applicant provides a sealing device which seals the opening between the tire and the wheel to prevent the escape of air during inflation. The device is arranged to fit all standard sizes of automobile wheels, and it is arranged to seal the tire without any substantial exertion on the part of the operator. The device, in one form, securely holds the wheel on a wheel holding table so as to prevent movement of the wheel during the inflating operation. Once the tire is inflated the device may be quickly and easily removed from the tire.

Included among the objects and advantages of the present invention is to provide a simple and easily operated tubeless tire inflator which is useful for the various standard sizes of automobile wheels now available. The device, furthermore, provides a simple assembly to aid the inflation of tubeless tires without removing the wheel and tire from the table used to hold the wheel during mounting and dismounting operations. The device, also, provides means for holding the tire securely on a tire mounting table during the inflating procedure to thereby prevent movement of the wheel.

These and other objects and advantages of the present invention may be readily ascertained by referring to the following description and illustrations in which:

Fig. 3 is a top elevation of the device of Fig. 2; and

Fig. 4 is a side elevational view in partial section showing the sealing ring of the device of the invention.

Figure 1:
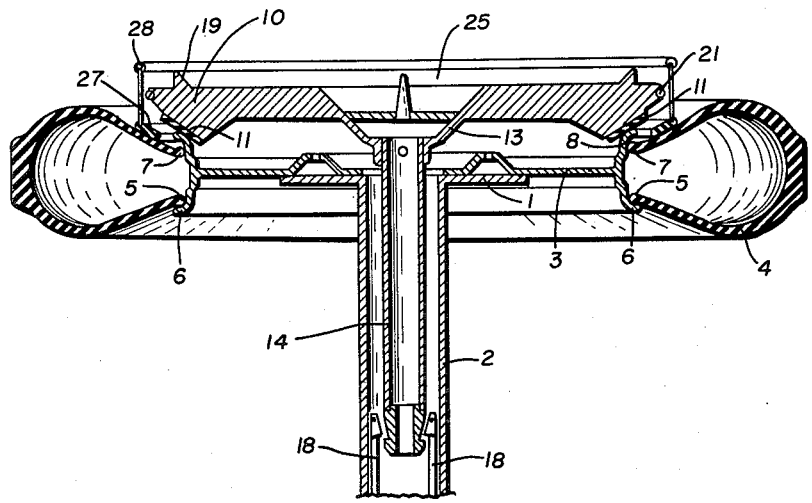
Fig. 1 is a cross-sectional elevation of a device according to the invention illustrating the assembly in use on a tubeless tire mounted on a wheel.
Figure 2:
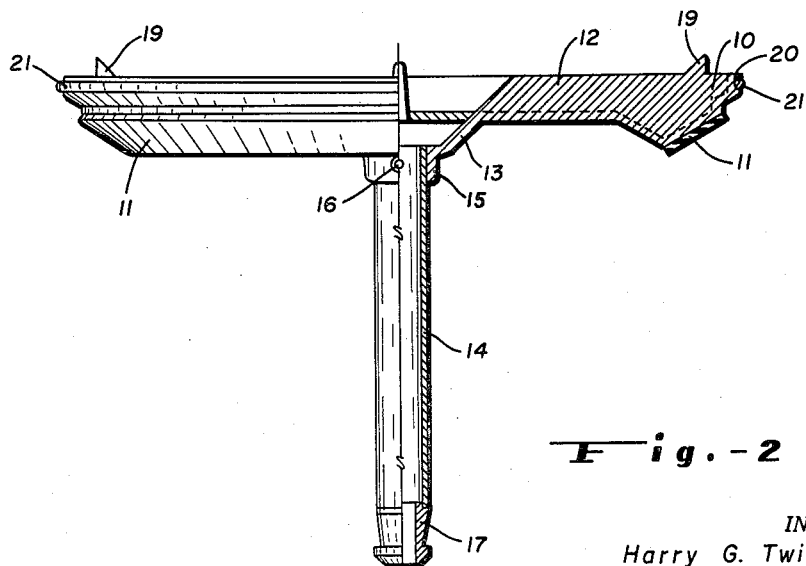
Fig. 2 is a partial sectional view of a wheel-holding sub-assembly of the device of the invention.

The tubeless tire inflator of the present invention may be used in conjunction with numerous tires holding tables, wherein the vehicle wheel is held in a horizontal position. Two such devices are illustrated in my co-pending applications Serial No. 429,566, filed May 15, 1954, which matured into Patent No. 2,825,395; and Serial No. 521,129, filed July 11, 1955, for Tire Holding Table. In the particular type of tire mounting device, the wheel is placed in a horizontal position on the tire holding table, and a center rod having a wheel grip is used to clamp the wheel on the wheel holding table. It will be obvious from the description of the device that it is also useful with many types of wheel holding tables having various wheel-holding or clamp-down devices.

In the device illustrated, a wheel holding table having a horizontal portion 1 and an upright tubular portion 2 supporting the table portion 1 supports a vehicle wheel 3 in substantially horizontal position. The wheel 3 has a tubeless tire 4 mounted thereon. Normal mounting of the tire on the wheel forces the lower bead 5 of the tire into substantial engagement with the lower bead holding rim flange 6, while the upper bead 7 is held away from rim flange 8 due to the fact that the walls of the tire are not stiff enough to make the bead pop aaginst the bead holding rim flange. An annular ring contact 10 having a soft, resilient, flexible surface 11 is arranged to seat on the wheel with the resilient surface 11 resting on the bead holding rim flange of the wheel. The surface 11 is disposed at an acute angle to a perpendicular plane through the ring axis. Radial reinforcing webs 12 interconnect a center conical portion 13 with the rim portion 10. A center tubular clamp-down post 14 is secured into a hub 15 of the cone 13 by means of a set screw 16. The lower end of the tube 14 has a clamping mandrel 17 which is arranged to engage a plurality of gripping pawls 18. One such pawl arrangement is described in my co-pending application Serial No. 521,129, indicated above. Any type of clamping means, however, may be utilized to hold the center post onto the table. In the present case, however, the pawls swing inwardly and engage the clamping mandrel 17 as they are pulled downwardly so that the surface 11 engages the rim of the wheel, securely holding the wheel on the table. The rim 10 with its flexible resilient face 11 is pulled tightly onto the wheel to form a tight seal therebetween. Legs 19 are secured on the webs 12 to support the device when not in use.

The surface 11 is disposed at an angle to a radial plane passing through the axis of the clamp-down wheel to permit an effective seal with the variation in the size of wheels on which the device is used. For example, in common use are vehicle wheels having diameters of 14, 15, 16 and 17 inches. The sloping surface 11 permits the use of the device with any of these sizes and still provides an adequate seal therebetween for use in inflating tubeless tires mounted on such wheels.

An O-ring seal 21 is secured in a groove 20 which encompasses the maximum periphery of the ring 10. The O-ring seal has greater cross-sectional dimensions than the groove so that it extends beyond any portion of the ring 10 and when completely filling the groove it will extend beyond the ring.

A thin-walled tube or ring 25 having a substantial axial length is arranged to telescope over the ring 10 and be reciprocable thereon. The O-ring seal 21 contacts the inner surface of the ring 25 forming an air-tight seal while permitting movement of the two parts. The ring 25 is made, in one form, of a thin piece of strap metal rolled into a circle and joined at the ends by a tie bar 26 welded to both ends. The joint should be welded or otherwise secured to have a substantially leak-proof joint. The upper edge of the ring 25 is rolled at 28 to prevent sharp edges. A rubber lip may also be secured to the edge by any known means. The lower edge of the ring 25 has a soft resilient lip 27 secured thereto which is arranged to seal the ring 25 to a tire wall. The lip 27 may engage portions of a tire wall which has raised letters or numbers thereon, so the lip should be a material such as sponge rubber to effectively form a seal over the raised portions.

In using the device of the invention, a vehicle wheel held on a wheel holding table after removal of the wheel holding center post, is in position to receive the inflating device without movement of the wheel. The ring 10 is placed over the wheel 3 with the center post 14 in the tube 2. The hold down mechanism is activated so that pawls 18 engage the mandrel 17 pulling the ring tightly onto the wheel. The surface 11 engages the rim of the wheel forming a seal and holding the wheel in place. In the event that the wheel is not aligned on the table, cone 13 moves the wheel into substantial alignment. The ring 25 is then telescoped over the ring 10, and edge 27 engages and seals on the wall of the tire. The seal on the rim and the seal on the tire wall holds air introduced into the tire. As the tire starts to inflate it expands pushing the upper tire wall upwardly and also pushing up the ring 25. When the upper bead snaps against the upper rim flange, the ring 25 may be removed and the ring 10 may be removed. Once the beads snap into place the tire may be inflated without further aid.

Various types of center posts or hold-down means may be used with the ring 10 to hold it on the rim of the wheel tightly enough to form a seal therebetween. Further, any type of seal may be used between the two rings which permits a reciprocal movement between them. In making the rings, the maximum diameter of ring 10 should be such as to extend over the rim of the wheel to permit the ring 25 to engage the wall of the tire. The lateral extent of the surface 11 is determined by the maximum and minimum sizes of wheels on which it is to be used.

While the invention has been described by reference to specific embodiments there is no intent to limit the scope of the invention to the precise details so set forth, except insofar as defined in the following claims.

I claim:

1. A device of the character described comprising in combination a rigid ring having an enlarged resilient annular surface arranged to engage and seat on the upper rim of a vehicle wheel with a substantially air-tight seal, a rigid tube arranged to telescope over said ring and engage the side wall of a tire mounted on the wheel, said tube having a lower resilient surface for forming an air-tight seal with the side wall of the tire with which it is in contact adjacent the upper rim of the wheel, and means for reciprocably sealing the inner surface of said rigid tube to said ring so as to form an air-tight seal between the upper rim of such a wheel and the side wall of a mounted tire to thereby permit the tire to be inflated.

2. A device of the character described comprising in combination a ring having an enlarged annular surface inclined upwardly from the horizontal and of substantial lateral extent and arranged to engage the upper rim of a vehicle wheel, said surface being covered by a flexible resilient material arranged to form a substantially air-tight seal with the upper wheel rim, means for holding said ring in tight contact with a wheel, means for centering said ring on a wheel, a tube arranged to telescope over said first ring, said tube having a flexible resilient lower surface for seating on and forming an air-tight seal with the side wall of the tire with which it is in contact, and an O-ring seal for reciprocably sealing the inner surface of said tube to said first ring so as to form an air-tight seal between the tire side wall and the upper rim of the wheel on which it is mounted and thereby permit the tire to be inflated.

3. A device of the character described comprising in combination a ring having an enlarged annular surface of substantial lateral extent directed outwardly and upwardly at an obtuse angle from the axis of the ring and arranged to engage a rim of multiple sizes of vehicle wheels, said surface being covered by a flexible resilient material arranged to form a substantially air-tight seal with the rim with which it is in contact, means for maintaining said surface in air-tight sealing relation with the rim of a wheel, a tube arranged to telescope over said ring, said tube having a flexible, resilient lower surface for forming an air-tight seal with the side wall of the tire with which it is in contact, and an O-ring seal for reciprocably sealing said ring to the inner surface of said tube so as to form an air-tight seal between the side wall of the tire and the rim of the wheel on which it is mounted and thereby permit the tire to be inflated.

4. A device of the character described comprising in combination a ring-like member having an annular surface of substantial lateral extent inclined upwardly and outwardly from the axis of said member, said annular surface being resilient and arranged to seat with an air-tight seal on the upper rim of a vehicle wheel, means for maintaining said member on a vehicle wheel so as to maintain the seal therebetween, an annular flange mounted on said member extending outwardly beyond the lateral extent of said surface, a rigid tube telescoped over said member and reciprocably sealed to said flange with an air-tight seal therebetween, and a resilient lower edge on said tube for seating and sealing against the side wall of a vehicle tire so as to form an air-tight chamber between the seal of the tire side wall and the seal on rim of the vehicle wheel.

References Cited in the file of this patent

UNITED STATES PATENTS

| | | |
|---|---|---|
| 2,406,771 | Hughes | Sept. 3, 1946 |
| 2,418,849 | Polt | Apr. 15, 1947 |
| 2,615,506 | Wilson | Oct. 28, 1952 |
| 2,792,057 | Schreiner | May 14, 1957 |

FOREIGN PATENTS

| | | |
|---|---|---|
| 607,925 | Great Britain | Sept. 7, 1948 |